United States Patent
Gauvin et al.

(10) Patent No.: US 9,989,953 B2
(45) Date of Patent: Jun. 5, 2018

(54) VISUAL INTERFACE AND CONTROL OF CONVERTING MACHINE OPERATIONS

(71) Applicant: BOBST LYON, Villeurbanne (FR)

(72) Inventors: Valérie Gauvin, St. Just Chaleyssin (FR); Dominique Ravot, Villieu-Loyes-Molon (FR)

(73) Assignee: BOBST LYON (FR)

( * ) Notice: Subject to any disclaimer, the term of this patent is extended or adjusted under 35 U.S.C. 154(b) by 380 days.

(21) Appl. No.: 14/759,968

(22) PCT Filed: Jan. 7, 2014

(86) PCT No.: PCT/EP2014/000008
§ 371 (c)(1),
(2) Date: Jul. 9, 2015

(87) PCT Pub. No.: WO2014/108324
PCT Pub. Date: Jul. 17, 2014

(65) Prior Publication Data
US 2015/0355623 A1    Dec. 10, 2015

(30) Foreign Application Priority Data

Jan. 11, 2013  (FR) ...................................... 13 50267

(51) Int. Cl.
*G05B 19/18*  (2006.01)
*B41F 33/02*  (2006.01)
(Continued)

(52) U.S. Cl.
CPC ............ *G05B 19/182* (2013.01); *B41F 13/56* (2013.01); *B41F 19/004* (2013.01);
(Continued)

(58) Field of Classification Search
CPC .. G05B 19/182; B41J 3/4073; G06F 3/04847; G06F 3/04842; B41F 33/0009; B41F 19/004; B41F 13/56; B41F 33/02
See application file for complete search history.

(56) References Cited

U.S. PATENT DOCUMENTS 3,613,578 A * 10/1971 Heurich .................... B41F 5/24
                                                                101/352.13
4,071,896 A *  1/1978 Boyer, III ............ G05B 19/188
                                                                700/127
(Continued)

FOREIGN PATENT DOCUMENTS

EP    0 616 886 A1    9/1994
EP    2 415 605 A1    2/2012

OTHER PUBLICATIONS

Twede, D.; Selke, S.E.M.; Kamdem, D.-P.; and Shires, D., "Cartons, Crates and Corrugated Board, Handbook of Paper and Wood Packaging Technology, Second Edition", 2015, DEStech Publications, Inc., ISBN No. 978-1-60595-135-5.*
(Continued)

*Primary Examiner* — Mohammad Ali
*Assistant Examiner* — Kelvin Booker
(74) *Attorney, Agent, or Firm* — Ostrolenk Faber LLP (57) ABSTRACT

A control method for controlling a converting machine that acts on plate elements for forming containers, the method including displaying with a graphical control interface at least one image representing a plate element or a container formed by a plate element, and control areas which are superimposed on the image and which respectively symbolize characteristic magnitudes of the conversions to be induced on each plate element, receiving by a processing unit a command entered individually by the operator by activating a control area, and controlling in response to the individually entered command, the processing unit to gen- (Continued)

erate at least two respective adjustment signals correlated by a predetermined adjustment law to adjust at least two respective adjustable parameters, whereby corresponding converting members induce a change in a characteristic magnitude.

12 Claims, 2 Drawing Sheets

(51) Int. Cl.
  *G06F 3/0484* (2013.01)
  *B41J 3/407* (2006.01)
  *B41F 19/00* (2006.01)
  *B41F 33/00* (2006.01)
  *B41F 13/56* (2006.01)

(52) U.S. Cl.
  CPC .......... *B41F 33/0009* (2013.01); *B41F 33/02* (2013.01); *B41J 3/4073* (2013.01); *G06F 3/04842* (2013.01); *G06F 3/04847* (2013.01)

(56) References Cited

U.S. PATENT DOCUMENTS

| | | | | | |
|---|---|---|---|---|---|
| 5,033,668 | A * | 7/1991 | Cohen | ...................... | B26F 1/44 229/120.12 |
| 5,156,584 | A * | 10/1992 | Cohen | ...................... | B26F 1/44 493/354 |
| 5,207,376 | A * | 5/1993 | Cohen | ...................... | B26F 1/44 229/116.1 |
| 5,630,363 | A * | 5/1997 | Davis | .................... | B41F 11/00 101/141 |
| 5,764,518 | A * | 6/1998 | Collins | .................. | B25J 9/1617 700/117 |
| 6,829,969 | B1 * | 12/2004 | Sullivan | ................ | B65H 3/063 271/265.01 |
| 9,403,383 | B1 * | 8/2016 | Liu | ...................... | B41J 11/0015 |
| 9,654,666 | B1 * | 5/2017 | Snowball | ............... | H04N 1/393 |
| 2001/0034592 | A1 * | 10/2001 | Herman | ................ | B23Q 35/12 703/13 |
| 2002/0002449 | A1 * | 1/2002 | Herman | .............. | G06F 11/2252 703/22 |
| 2003/0170357 | A1 * | 9/2003 | Garwood | ................ | A23B 4/16 426/392 |
| 2004/0000121 | A1 * | 1/2004 | Ichikawa | .................. | B65B 5/06 53/173 |
| 2004/0099388 | A1 * | 5/2004 | Chen | ...................... | B05C 1/165 162/134 |
| 2004/0149155 | A1 * | 8/2004 | Thiessen | ................ | B41J 2/0057 101/492 |
| 2005/0045292 | A1 * | 3/2005 | Lindsay | .................. | B32B 29/00 162/109 |
| 2005/0144189 | A1 * | 6/2005 | Edwards | ............. | G06F 17/3002 |
| 2005/0210832 | A1 * | 9/2005 | Tassin | .................... | B65B 59/00 53/396 |
| 2007/0000365 | A1 * | 1/2007 | Hirahara | .................. | B26D 5/02 83/76.1 |
| 2007/0144375 | A1 * | 6/2007 | Jeschonneck | ......... | B41F 31/045 101/248 |
| 2007/0182977 | A1 * | 8/2007 | Martin | .................. | G06F 3/1205 358/1.13 |
| 2007/0229904 | A1 * | 10/2007 | Mori | ..................... | G06F 17/211 358/1.18 |
| 2007/0245916 | A1 * | 10/2007 | Bird | ......................... | B41F 5/24 101/416.1 |
| 2008/0319566 | A1 * | 12/2008 | McGuinness, Jr. | ..... | B65B 67/08 700/97 |
| 2009/0020028 | A1 * | 1/2009 | Christel | .................... | B41F 7/40 101/248 |
| 2009/0188405 | A1 * | 7/2009 | Stiel | ........................ | B41F 17/00 101/484 |
| 2009/0219550 | A1 * | 9/2009 | Levin | .................... | G06F 3/1205 358/1.1 |
| 2010/0242760 | A1 * | 9/2010 | Otsuka | .................. | B41F 27/005 101/382.1 |
| 2010/0302331 | A1 * | 12/2010 | Bober | .................... | B41J 3/4073 347/104 |
| 2011/0126726 | A1 * | 6/2011 | Alt-Steiner | ......... | B41F 27/1206 101/91 |
| 2011/0205321 | A1 * | 8/2011 | Kobayashi | ............... | B41J 2/155 347/102 |
| 2012/0149561 | A1 * | 6/2012 | Ribi | ....................... | B41M 3/005 503/200 |
| 2012/0183452 | A1 * | 7/2012 | Schalkhammer | ...... | G01N 21/78 422/426 |
| 2013/0145946 | A1 * | 6/2013 | Chiari | .................... | B41F 9/021 101/481 |
| 2013/0184133 | A1 * | 7/2013 | Sugimoto | .............. | B65H 43/04 493/29 |
| 2013/0187970 | A1 * | 7/2013 | Inoue | ......................... | B41J 2/12 347/14 |
| 2013/0265596 | A1 * | 10/2013 | Fujimoto | ............ | G06F 3/04842 358/1.9 |
| 2014/0116276 | A1 * | 5/2014 | Bird | ........................ | H04W 4/02 101/424.1 |
| 2014/0121092 | A1 * | 5/2014 | Schindler, II | ........ | G03G 15/224 493/415 |
| 2014/0148322 | A1 * | 5/2014 | Sireix | .................... | B31B 17/60 493/56 |
| 2014/0296386 | A1 * | 10/2014 | Maeda | .................... | C08L 67/02 523/456 |
| 2015/0210103 | A1 * | 7/2015 | Weihs | ..................... | C04B 26/02 101/395 |
| 2015/0290085 | A1 * | 10/2015 | Niven | .................... | A61J 7/0076 222/23 |
| 2015/0316955 | A1 * | 11/2015 | Dodds | ..................... | G06F 3/041 345/173 |
| 2016/0130025 | A1 * | 5/2016 | Azad | ..................... | B65B 61/025 493/1 |
| 2016/0155030 | A1 * | 6/2016 | Blank | ................ | G06K 15/1863 358/1.2 |
| 2017/0017779 | A1 * | 1/2017 | Huang | .................... | G06F 21/16 |
| 2017/0203599 | A1 * | 7/2017 | Griffith | .................... | B42D 5/00 |
| 2017/0291408 | A1 * | 10/2017 | Yamamoto | ................ | B41F 5/24 |
| 2017/0297303 | A1 * | 10/2017 | Swartz | .................... | B29C 43/20 |
| 2018/0009616 | A1 * | 1/2018 | Kodama | .................. | B65H 7/20 |

OTHER PUBLICATIONS

Lee, B., "Design Characteristics Unique to the Flexographic Printing Process", 1998, Thesis/Dissertation Collections, Rochester Institute of Technology, RIT Scholar Works.*

Boillon, E., "A Study of Corrugated Shelf-Ready Packaging (SRP) Appropriate to Colgate Palmolive Products", 2007, Thesis, Rochester Institute of Technology.*

International Search Report dated Mar. 25, 2014 issued in corresponding International patent application No. PCT/EP2014/000008.

* cited by examiner

VISUAL INTERFACE AND CONTROL OF CONVERTING MACHINE OPERATIONS

CROSS-REFERENCE TO RELATED APPLICATIONS

The present application is a 35 U.S.C. § 371 national phase conversion of PCT/EP2014/000008, filed Jan. 7, 2014, which claims priority of French Application No. 1350267, filed Jan. 11, 2013. The contents of both applications are incorporated by reference herein. The PCT International Application was published in the French language.

FIELD OF THE INVENTION

The present invention relates to a method for controlling a converting machine of a printing machine, folding machine or gluing machine type configured to act on plate elements, such as cardboard sheets, a converting machine controlled by the method, and a computer program suitable for being stored in a converting machine to perform the method.

FIELD OF APPLICATION

The present invention can be applied to the field of converting cardboard sheets for forming packaging containers. In particular, the present invention can apply to printing, folding and/or gluing machines.

DEFINITION

In the present application, the term plate element designates a substantially flat product composed of at least one material, such as paper, cardboard, or polymer, suitable for receiving a print layer and for forming packaging containers. The term plate element thus designates sheets of cardboard, corrugated cardboard, laminated corrugated cardboard, cardboard plates, flexible plastic, such as polyethylene (PE), polyethylene terephthalate (PET) and biaxially oriented polypropylene (BOPP).

BACKGROUND AND PRIOR ART

EP 0616886 discloses a printing machine for printing on cardboard sheets intended to form containers. The converting machine comprises converting members, in particular a plate cylinder and an anilox cylinder, for inducing a conversion of each cardboard sheet, in this case printing by ink deposition. The plate cylinder and anilox cylinder operate according to adjustable parameters; in particular, their axes can be moved by motors. In addition, the converting machine comprises a graphical interface, a control keyboard for entering commands, and a processing unit.

According to the control method of the converting machine, the operator must enter a plurality of distinct commands for acting on a plurality of adjustable parameters that influence the same conversion.

However, the converting machine operates with many adjustable parameters, typically forty, including the three directions of movement, in both directions, of each converting member, which can influence the same conversion independently.

For example, for adjusting the contrast of a color on each plate element, the operator can choose to adjust eleven parameters independently, in an increasing direction or in a decreasing direction, i.e. twenty-two possible adjustments:

the spatial position of the plate cylinder according to three axes;
the spatial position of the anilox cylinder according to three axes;
the spatial position of the counter-pressure member according to three axes;
the rotation speed of the plate cylinder, and/or
the rotation speed of the anilox cylinder.

For acting on these multiple adjustable parameters, the operator must enter a plurality of distinct commands successively. The operator must therefore necessarily know how each adjustable parameter influences the forthcoming conversion on the plate elements. In particular, the operator must necessarily anticipate the consequences of each of the adjustments thereof in an increasing direction or in a decreasing direction.

Consequently, it is long and tedious to implement a control method of the prior art for adjusting a converting machine of the prior art. Typically, the adjustment time for varying a conversion is generally longer than 10 minutes.

In addition, a control method of the prior art leads to a high risk of committing many adjustment errors, in particular in the case of an insufficiently experienced operator.

SUMMARY OF THE INVENTION

The present invention aims in particular to solve, completely or partially, the problems mentioned above.

For this purpose, the subject matter of the present invention is a control method, for controlling a converting machine of a printing machine, folding machine or gluing machine type that acts on plate elements for forming containers, the converting machine comprising at least:
  converting members, such as a plate cylinder or a folding roller, each converting member being suitable for performing at least one action inducing, directly or indirectly, a conversion of each plate element, each converting member being configured for operating according to at least one adjustable parameter, e.g. an adjustable position;
  a graphical control interface, e.g. a touch screen, configured for displaying control areas so as to enable an operator to enter commands individually; and
  a processing unit connected to the graphical control interface and to the converting members;
the control method comprising:
  a display step, in which the graphical control interface displays at least one image representing a plate element or a container formed by a plate element after folding, and in which the graphical control interface displays control areas which are superimposed on the image and which respectively symbolize the characteristic magnitudes of the conversions to be induced on each plate element, these characteristic, for example, including the contrast of a printed color or the depth of a fold;
  a receiving step, in which the processing unit receives one of the commands entered individually by the operator by activating a control area; and
  a control step, in which, in response to the individually entered command, the processing unit generates at least two respective adjustment signals correlated by a predetermined adjustment law to adjust at least two respective adjustable parameters, so that the corresponding converting members induce a change in the characteristic magnitude.

In other words, in the display step, the graphical control interface displays at the screen background a product to be converted, i.e. a plate element or a converted product, i.e. a container. On this screen background, each control area comprises an ideogram symbolizing the characteristic magnitude to be adjusted. After the operator has activated a control area, the processing unit causes actuators to change the characteristic magnitude in the way selected by the operator.

The graphical control interface minimizes the adjustment time and the time for training an operator because it directly shows the operator the product to be converted, the plate element, and the physical magnitudes to be adjusted on the product to be converted. In a control method of the prior art, the graphical control interface represents the converting machine, its converting members and their adjustment axes, which do not embody the product to be converted.

Thus, such a control method enables an operator to adjust a converting machine according to the invention with a considerably reduced adjustment time, since the operator has prerecorded adjustments available. Typically, thanks to the invention, this adjustment time for a conversion can be about 4 minutes, or even less; whereas, the control method of the prior art requires an adjustment time of more than 10 minutes.

In addition, the control method can be supervised by an operator with little experience and unfamiliar with the converting machine; whereas the control method of the prior art requires a very experienced and knowledgeable operator on the converting machine. Furthermore, the risk of adjustment errors is limited or even nil.

In the present application, the term conversion or one of its variations designates a physical change taking place on a plate element, e.g. adding an ink layer forming a pattern, forming a fold, cutting a slit etc. Such a conversion of a plate element does not necessarily involve a great physical change. In other words, an operator can measure, and sometimes see, at least one difference between a plate element after this conversion and this same plate element before this conversion.

For example, the plate cylinder performs an action directly inducing a conversion, namely depositing an ink layer on each plate element. Conversely, the anilox cylinder performs an action indirectly inducing a conversion, namely transferring a quantity of ink to the plate cylinder. More generally, the converting members in contact with the plate elements, such as the plate cylinder, directly induce a conversion of the plate elements. Conversely, the converting members away from the plate elements indirectly induce a conversion of the plate elements, such as the anilox cylinder.

In the present application, the term control area designates a portion of the graphical control interface which can be activated, i.e. on which the operator can act in order to enter the desired command individually.

In the present application, the term connect and its variations designate a connection enabling the transmission and/or the reception of at least one signal transmitted between two components. This connection may be implemented by an electric cable, by electromagnetic waves or by any other equivalent means.

In the control method according to the invention, the adjustable parameters correlated by a predetermined adjustment law are adjusted concomitantly, i.e. together, and simultaneously or successively. In other words, a same predetermined adjustment law concomitantly induces variations in each of the adjustable parameters concerned, whether these variations are simultaneous or successive.

According to one embodiment of the invention, the converting members comprise:

a rotatably mounted plate cylinder, suitable for carrying a plate and arranged for rolling the plate on each plate element so as to deposit a quantity of ink thereon according to a pattern defined on the plate;

an anilox cylinder arranged parallel to the plate cylinder to receive the quantity of ink from an ink reservoir and to transfer the quantity of ink to the plate cylinder by contact with the plate cylinder; and a counter-pressure member arranged parallel to the plate cylinder to exert pressure forces on each plate element rolling on the plate cylinder;

and the processing unit generates at least two adjustment signals correlated by a so-called contrast law, as a predetermined adjustment law, intended to adjust the quantity of ink deposited on each plate element, the adjustable parameters being selected in the group consisting of the distance between the plate cylinder and the engraved roller, the distance between the plate cylinder and the counter-pressure member, the rotation speed of the plate cylinder and the rotation speed of the anilox cylinder.

Thus, such adjustment signals enable the quantity of ink deposited on each plate element, and therefore the contrast of a color, to be quickly and simply adjusted.

According to one embodiment of the invention, the converting members comprise:

folding rollers arranged for forming at least one fold on each plate element;

at least one roller support suitable for supporting the folding rollers; and a counter-pressure member arranged for exerting pressure forces on each plate element in a direction opposite to the forces exerted by the folding rollers;

and the processing unit generates at least two adjustment signals correlated by a so-called fold law intended to adjust the depth of a fold on each plate element, the adjustable parameters being selected in the group consisting of the squeezing of the folding rollers onto the fold so as to hold the container in the folded state, the position of the roller support and the distance between the roller support and the counter-pressure member.

Thus, such adjustment signals enable the depth of a fold and the perpendicularity thereof to be quickly and simply adjusted on each plate element.

According to one embodiment of the invention, the control method further comprises a reconfiguration step in which an operator implements configuration means so as to reconfigure at least one predetermined adjustment law.

Thus, such a reconfiguration step refines each predetermined adjustment law so as to minimize the adjustment time and maximize the quality of the converted product.

According to one embodiment of the invention, the converting machine further comprises a transport device suitable for transporting the plate elements successively toward each converting member, so that each converting member can perform said at least one action, the control method further comprising a preliminary stopping step in which the transport device is stopped before implementing the step in which the processing unit generates adjustment signals.

In other words, the adjustments are made between two series of plate elements. Thus, such a preliminary stopping step enables the adjustments to be tested before restarting the production of a series.

Alternatively to this alternative, the step in which the processing unit generates adjustment signals may be implemented without a preliminary stopping step. Thus, the adjustment time does not slow down production, since the adjustments are made online, during production.

In addition, the subject matter of the present invention is a converting machine of a printing machine, folding machine or gluing machine type that acts on plate elements for forming containers, the converting machine comprising at least:

- converting members, such as a plate cylinder or a folding roller, each converting member being suitable for performing at least one action inducing, directly or indirectly, a conversion of each plate element, each converting member being configured for operating according to at least one adjustable parameter, e.g. an adjustable position;
- a graphical control interface, e.g. a touch screen, configured for displaying at least one image representing a plate element or a container formed by a plate element after folding, and configured for displaying control areas which are superimposed on said image and which respectively symbolize the characteristic magnitudes of the conversions to be induced on each plate element, these characteristic magnitudes comprising, for example, the contrast of a printed color or the depth of a fold; and
- a processing unit connected to the graphical control interface and to the converting members; the processing unit is programmed for generating, in response to a command entered individually by the operator, at least two respective adjustment signals correlated by a predetermined adjustment law, so as to adjust at least two respective adjustable parameters, so that the corresponding converting members induce a change in said characteristic magnitude.

Thus, such a converting machine considerably reduces the adjustment time, since the operator has prerecorded adjustments available. Typically, thanks to the invention, this adjustment time for influencing a conversion can be about 4 minutes, or even less, whereas a control method of the prior art required an adjustment time of more than 10 minutes.

In addition, this converting machine can be controlled by an inexperienced operator unfamiliar with the converting machine; whereas, a converting machine of the prior art requires a very experienced and knowledgeable operator on the converting machine. Furthermore, the risk of adjustment errors is limited or even nil.

According to one embodiment of the invention, the graphical control interface comprises a touch screen suitable for transmitting to the processing unit a command entered individually by an operator pressing on a control area of the touch screen.

Thus, such a touch screen forms an ergonomic and compact graphical control interface.

Alternatively to this embodiment, the graphical control interface comprises a screen and a mouse type pointing device.

According to one embodiment of the invention, the converting machine further comprises adjustment actuators, each adjustment actuator being suitable for adjusting at least one adjustable parameter in response to one of said adjustment signals.

These adjustment actuators comprise, for example, motors for moving the plate cylinder, the anilox cylinder or the counter-pressure member along three axes, or the actuators rotating the plate cylinder or the anilox cylinder.

According to one embodiment of the invention, the processing unit is configured for storing a plurality of predetermined adjustment laws, so as to adjust a plurality of respective adjustable parameters, in particular adjustable parameters influencing various conversions, such as the contrast of a color, the location of a color pattern on the plate element, the depth of a fold, the location of cuts, the size of the plate elements and the quality of folding.

Thus, such a processing unit can be used to selectively adjust a plurality of different conversions, or even all the conversions performed by the converting members, which facilitates control of the converting machine.

According to one alternative of the invention, the predetermined adjustment laws are established using experimental plans conducted preferably by the is manufacturer of the converting machine in order to determine experimentally the equations governing the result to be obtained on the finished container. Thus, these predetermined adjustment laws can be established by carrying out relatively few tests.

Furthermore, the subject matter of the present invention is a computer program suitable for being stored in a processing unit of a converting machine according to the invention, the computer program comprising coded instructions which, when the computer program is executed by the processing unit, performs the steps of the control method according to the invention.

Thus, such a computer program can be used to control a converting machine according to the invention following a control method according to the invention.

The embodiments and the alternatives mentioned above can be adopted alone or in any technically feasible combination.

BRIEF DESCRIPTION OF THE DRAWINGS

The present invention will be best understood and its advantages will also emerge in the light of the following description, given solely by way of a non-restrictive example and referring to the attached drawings, in which.

DETAILED DISCLOSURE OF THE PREFERRED EMBODIMENTS

Figures 1, 2, 5:
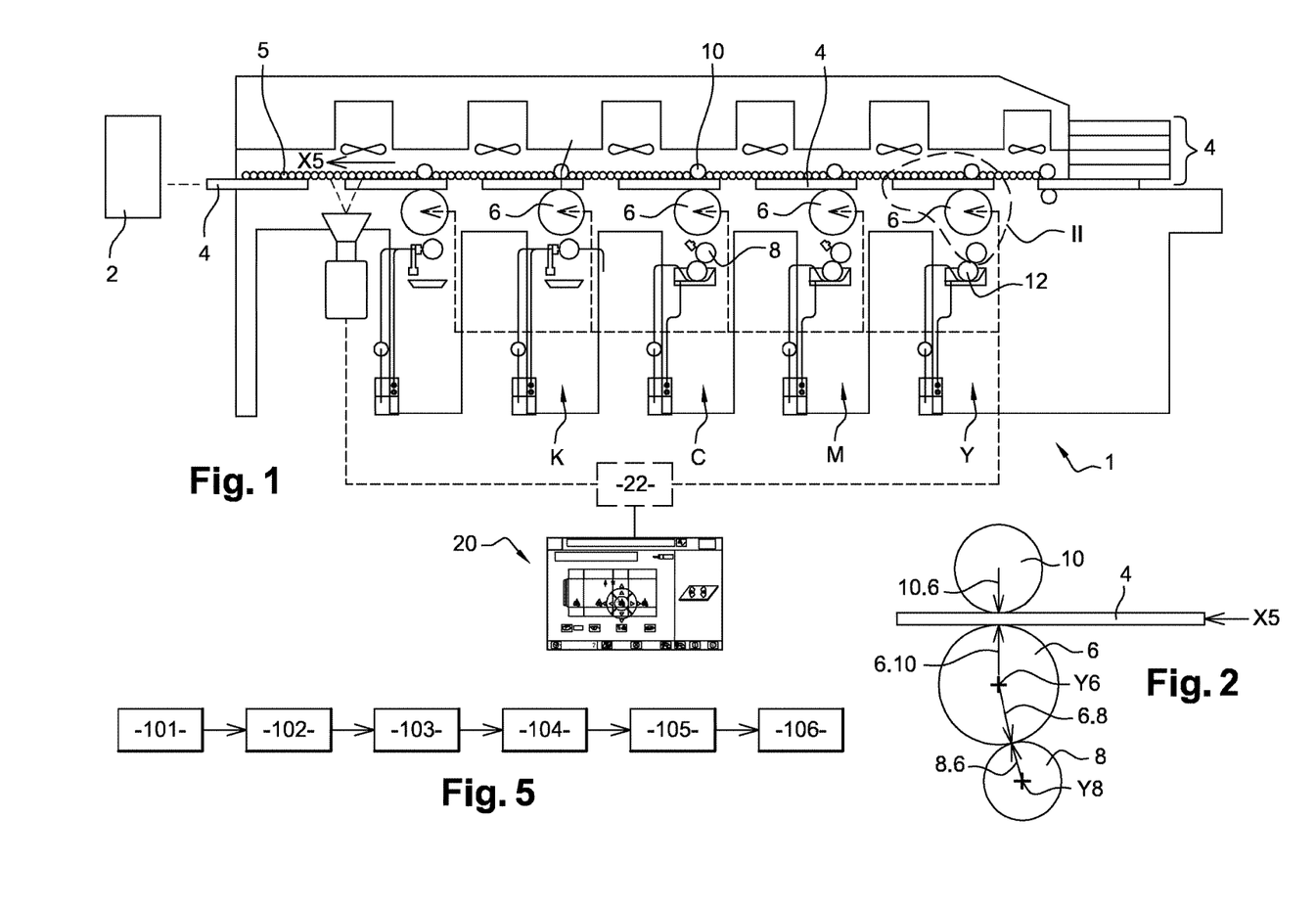
FIG. 1 is a schematic view of a converting machine according to the invention.
FIG. 2 is a schematic view on a larger scale of detail II in FIG. 1.
FIG. 5 is a flowchart illustrating a method according to the invention for controlling the converting machine in FIG. 1.

FIG. 1 illustrates a printing machine 1. In addition, FIG. 1 symbolizes a folding machine 2. The printing machine 1 and the folding machine 2 form converting machines intended to act upon cardboard sheets 4 or other plate elements for forming containers (not shown).

The printing machine 1 comprises a transport device 5 which is intended to transport the cardboard sheets 4 in a transport direction X5 in the printing machine 1, then in the folding machine 2.

The printing machine 1 comprises converting members each suitable for performing at least one action inducing, directly or indirectly, a conversion of each cardboard sheet 4. In particular, the printing machine 1 comprises the following converting members: plate cylinders 6, anilox cylinders 8 and counter-pressure members 10.

The printing machine 1 is suitable for performing four-color printing on each cardboard sheet, i.e. for depositing successively thereon:

a yellow ink layer in a part Y,
a red ink layer in a part M,
a blue ink layer in a part C, and/or
a black ink layer in a part K.

For this purpose, as shown in FIG. 2, the printing machine 1 comprises, for each color, a printing assembly comprising at least one plate cylinder 6, one anilox cylinder 8 and one counter-pressure member 10.

Each plate cylinder 6 is rotatably mounted about a respective axis Y6. Each plate cylinder 6 is suitable for carrying a plate, not shown. Each plate cylinder 6 is arranged for rolling the plate on each cardboard sheet 4 so as to deposit thereon a quantity of ink in a pattern defined on the plate.

Each anilox cylinder 8 extends along an axis Y8 which is parallel to the axis Y6 of a respective plate cylinder 6. The axes Y6 and Y8 are perpendicular to the transport direction X5. Each anilox cylinder 8 is arranged close to a respective plate cylinder 6 to receive the quantity of ink from an ink reservoir 12 and to transfer the quantity of ink to the plate cylinder 6 by contact with the plate cylinder 6.

Each counter-pressure member 10 herein has a substantially cylindrical shape arranged parallel to the respective plate cylinder 6 to exert pressure forces on each cardboard sheet 4 rolling on the plate cylinder 6. These pressure forces enable an ink layer to be deposited on the cardboard sheet 4.

Similarly, the folding machine 2 comprises the following converting members, (not shown): folding rollers, roller supports and counter-pressure members. Each folding roller is arranged for forming a fold on each cardboard sheet 4. Each roller support is suitable for supporting the folding rollers. Each counter-pressure member is arranged for exerting pressure forces on each cardboard sheet in a direction opposite to the forces exerted by the folding rollers.

The transport device 5 is suitable for transporting cardboard sheets 4 successively toward each converting member, so that each converting member can perform one or more actions inducing, directly or indirectly, a conversion of each cardboard sheet 4.

In the printing machine 1, each converting member is configured for operating according to one or more adjustable parameters. For example, a plate cylinder 6, an anilox cylinder 8 and a counter-pressure member 10 are configured for operating according to the adjustable parameters selected from the group consisting of:
the distance 6.8-8.6 between the plate cylinder 6 and the anilox cylinder 8, (the arrows 6.8 and 8.6 in FIG. 2 illustrate this adjustable parameter);
the distance 6.10-10.6 between the plate cylinder 6 and the counter-pressure member 10, (the arrows 6.10 and 10.6 in FIG. 2 illustrate this adjustable parameter);
the rotation speed of the plate cylinder 6; and
the rotation speed of the anilox cylinder 8.

Similarly, in the folding machine 2, each converting member is configured for operating with the adjustable parameters selected from the group consisting of the clamping of the folding rollers onto the fold so as to hold the container in the folded state, the position of the roller support and the distance between the roller support and the counter-pressure member. The clamping of the folding rollers serves to hold the plate element until the reception of the plate element, i.e. the folded container, in order to ensure the quality and repeatability of folding.

The printing machine 1 or the folding machine 2 further comprises adjustment actuators (not shown). Each adjustment actuator is suitable for adjusting at least one of these adjustable parameters. For example, an adjustment actuator can be formed by a motor suitable for moving a plate cylinder 6 or an anilox cylinder along two or three orthogonal directions.

In addition, as shown in FIG. 1, the printing machine 1 comprises a graphical control interface 20 and a processing unit 22. The processing unit 22 is connected to the graphical control interface and to the converting members, including each plate cylinder 6, each anilox cylinder 8 and each counter-pressure member 10.

These connections to the processing unit 22 are symbolized in FIG. 1 by dashes.

Figure 3:
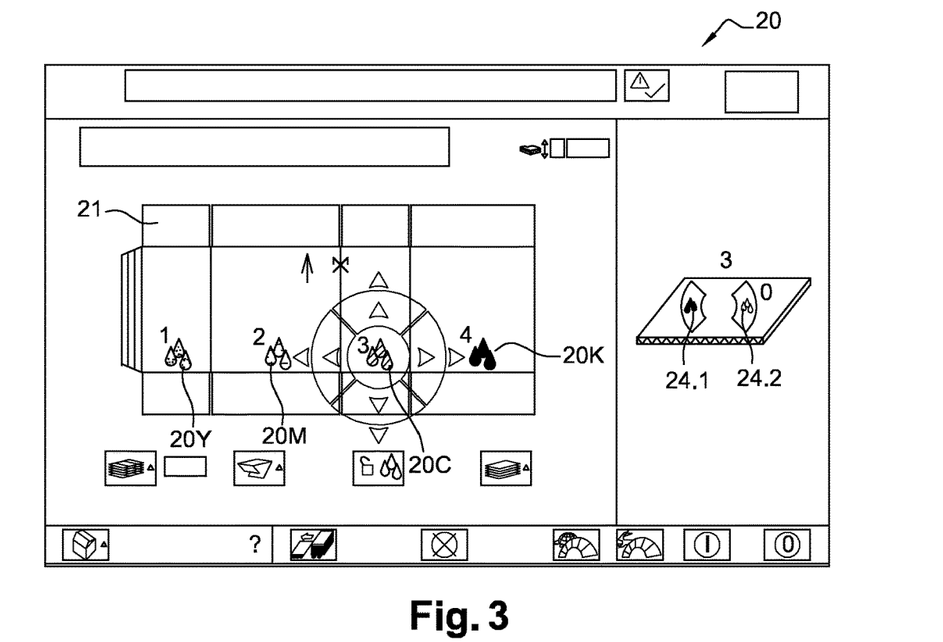
FIG. 3 is a view of a graphical control interface belonging to the converting machine in FIG. 1, during a display step of a method according to the invention.
Figure 4:
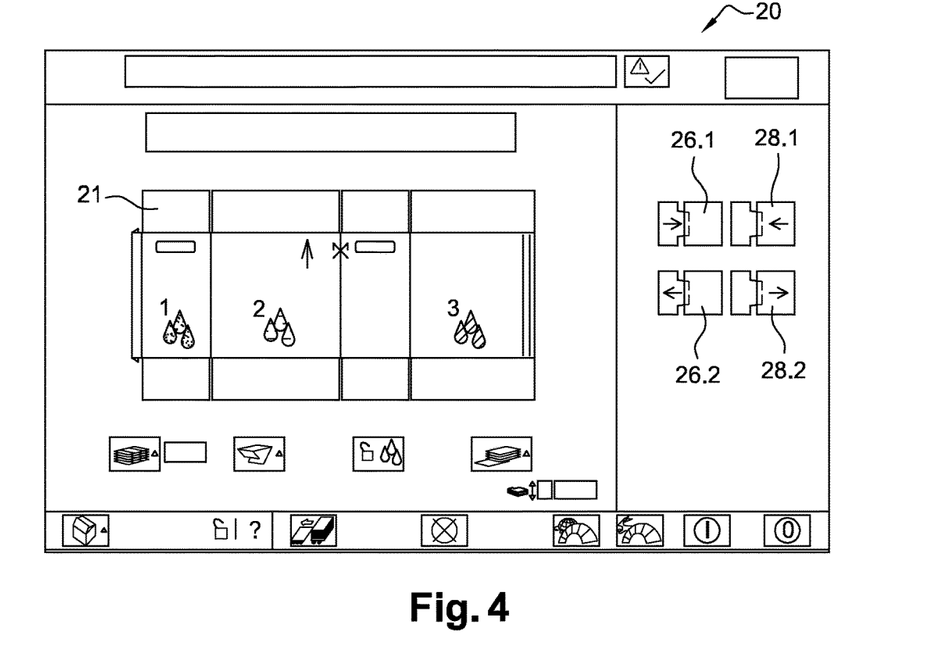
FIG. 4 is a view similar to FIG. 3, during the display step.

As shown in FIGS. 3 and 4, the graphical control interface 20 comprises herein a touch screen which is suitable for transmitting to the processing unit 22 a command entered individually by an operator pressing on a control area of the touch screen.

The graphical control interface 20 is configured for displaying at least one image 21 representing a cardboard sheet 4.

Alternatively or in a different menu, the graphical control interface may be configured for displaying a container formed by a cardboard sheet after folding.

In addition, the graphical control interface 20 is configured for displaying control areas which are superimposed on the image 21 and which respectively symbolize characteristic magnitudes of the conversions to be induced on each cardboard sheet 4, these characteristic magnitudes comprising, for example, the contrast of a printed color or the depth of a fold, as described below.

In the example of FIG. 3, the graphical control interface 20 displays in particular the management of each color with:
a control area 24.1, in which the operator can individually enter, simply by pressing, a command intended to reduce by one decrement the quantity of blue ink deposited on each cardboard sheet 4, which adjusts the blue contrast;
a control area 24.2, in which the operator can individually enter, simply by pressing, a command intended to increase by one increment the quantity of blue ink deposited on each cardboard sheet 4, which adjusts the blue contrast;
a control area 20C, which is currently activated and which provides access to the control areas 24.1 and 24.2;
a control area 20M, that the operator can activate for accessing contextual control areas which are identical to the control areas 24.1 and 24.2, in order to adjust the red contrast;
a control area 20Y, that the operator can activate for accessing contextual control areas which are identical to the control areas 24.1 and 24.2, in order to adjust the yellow contrast; and
a control area 20K, that the operator can activate for accessing contextual control areas which are identical to the control areas 24.1 and 24.2, in order to adjust the black contrast.

In the example of FIG. 4, the graphical control interface 20 displays in particular control areas for holding the fold either by clamping the fold or by moving it apart, with:
a control area 26.1, folded cardboard too open, in which the operator can individually enter, simply by pressing, a command intended to shift the position of the roller support by one decrement to the right, and therefore the distance between the roller support and the counter-pressure member, in order to adjust the depth of a fold in each cardboard sheet 4;
a control area 26.2, folded cardboard too closed, in which the operator can individually enter, simply by pressing, a command intended to shift the position of the roller support by one decrement to the left, and therefore the distance between the roller support and the counter-pressure member, in order to adjust the depth of a fold in each cardboard sheet 4;

a control area 28.1, folded cardboard too open, in which the operator can individually enter, simply by pressing, a command intended to shift the clamping of the rollers by one decrement to the right, in order to adjust the depth of a fold in each cardboard sheet 4; and a control area 28.2, folded cardboard too closed, in which the operator can individually enter, simply by pressing, a command intended to shift the clamping of the rollers by one decrement to the left, in order to adjust the depth of a fold in each cardboard sheet 4.

In other words, the graphical control interface 20 is configured for displaying in the screen background a cardboard sheet 4 as the product to be converted. On this screen background, each control area 24.1, 24.2, 20C is a button that comprises an ideogram symbolizing the characteristic magnitude to be adjusted, for example, contrast, depth of a fold, etc.

The graphical control interface 20 minimizes the adjustment time and the time for training an operator. This is because it directly shows the operator the product to be converted, i.e. the cardboard sheet 4, and the physical magnitudes to be adjusted on this product to be converted.

FIG. 5 illustrates a control method according to the invention, for controlling the printing machine 1. This control method comprises:

a display step 102, in which the graphical control interface 20 displays the image 21 representing a cardboard sheet 4, and in which the graphical control interface 20 displays control areas 24.1, 24.2, 20C, etc. which are superimposed on the image 21 and which respectively symbolize the characteristic magnitudes of the conversions to be induced on each cardboard sheet 4, the characteristic magnitudes comprising, for example, the contrast of a printed color or the depth of a fold;

a receiving step 103, in which the processing unit 22 receives one of the commands entered individually by the operator by activating a control area 24.1, 24.2, 20C, etc.; and a control step 104, in which, in response to this individually entered command, the processing unit 22 generates respective adjustment signals correlated by a predetermined adjustment law so as to adjust the respective adjustable parameters, so that the corresponding converting members perform actions inducing a change in this characteristic magnitude during the conversion, printing contrast or depth of fold.

In the example of FIG. 3, the characteristic magnitude to be changed is the quantity of blue ink, and therefore the blue contrast. The corresponding converting members are the plate cylinder 6, the anilox cylinder 8 and the counter-pressure member 10. The predetermined adjustment law is a contrast law. The respective adjustment signals, according to this contrast law, enable all or part of the corresponding adjustable parameters to be adjusted, including in particular:

the distance 6.8-8.6 between the plate cylinder 6 and the anilox cylinder 8, (the arrows 6.8 and 8.6 in FIG. 2 illustrate this adjustable parameter);

the distance 6.10-10.6 between the plate cylinder 6 and the counter-pressure member 10, (the arrows 6.10 and 10.6 in FIG. 2 illustrate this adjustable parameter);

the rotation speed of the plate cylinder 6; and the rotation speed of the anilox cylinder 8.

Continuing with the example of FIG. 3, before the control step 104, the initial distance 6.8-8.6 between plate cylinder 6 and anilox cylinder 8 equals the thickness of the cardboard sheet minus 0.2 mm, and the initial distance 6.10-10.6 between plate cylinder 6 and counter-pressure member 10 equals the thickness of the cardboard sheet minus 0.5 mm.

When the operator presses on the control area 24.2, after the control step 104, for darkening the color blue, the associated contrast law (control step 104) correlates two adjustment signals to reduce the distance 6.8-8.6 by 0.05 mm and to reduce the distance 6.10-10.6 by 0.10 mm. The multiple trials conducted during the development of the present invention showed that these adjustments of these adjustable parameters can be used to obtain the desired quality and print contrast for at least 80% of the production configurations; only special productions with different material and ink required different adjustments.

In the example of FIG. 4, the characteristic magnitude to be changed is the depth of a fold. The corresponding converting members are the folding rollers, the roller support and the counter-pressure member. The predetermined adjustment law is a folding law. The respective adjustment signals are used to adjust, according to the folding law, all or part of the corresponding adjustable parameters, including in particular: the clamping of the folding rollers onto the fold of the container so as to hold the container in the folded state, the position of the roller support and the distance between the roller support and the counter-pressure member.

Continuing with the example of FIG. 4, before the control step 104, if the folded cardboard is too open or too closed, the operator selectively activates one of the control areas 26.1, 26.2, 28.1 and 28.2. After control step 104, an associated folding law correlates two adjustment signals to move the roller support, to the right or to the left, by 0.5 mm and to tighten or loosen the rollers by 0.5 mm.

The multiple trials conducted during the development of the present invention showed that these adjustments of these adjustable parameters can be used to obtain the desired depth of fold for at least 80% of the production configurations; only special productions with different material required different adjustments.

In the example of the figures, the processing unit 22 is configured for storing a plurality of predetermined adjustment laws to adjust a plurality of respective adjustable parameters, in particular, adjustable parameters influencing the contrast of the colors yellow, red, blue and black, the location of a color pattern on each cardboard sheet 4, the depth of a fold, the location of cuts, the size of the plate elements and the quality of folding.

Then, during an adjustment step 105, adjustment actuators receive these respective adjustment signals transmitted by the processing unit 22 and act accordingly on the converting members concerned. These adjustment actuators comprise, for example, motors for moving the plate cylinder 6, the anilox cylinder 8 or the counter-pressure member 10 along three axes, or the actuators rotating the plate cylinder or the anilox cylinder.

Thus, such a control method enables an operator to adjust the printing machine 1 or the folding machine 2 within a very short adjustment time, typically about 4 minutes, since the operator has prerecorded adjustments available. In addition, the control method can be supervised by an inexperienced operator unfamiliar with the printing machine 1 or the folding machine.

In the example of FIG. 5, the control method further comprises a preliminary stopping step 101, in which the transport device 5 is stopped before implementing the control step 104 in which the processing unit 22 generates adjustment signals. The adjustments are therefore made between two series of cardboard sheets 4. Thus, such a preliminary stopping step 101 enables the adjustments to be tested before restarting the production of a series.

In the example of FIG. 5, the control method further comprises a reconfiguration step 106, in which an operator may, if necessary, implement configuration means (not shown), so as to reconfigure at least one predetermined adjustment law.

Thus, the operator may refine each predetermined adjustment law, so as to minimize the adjustment time and maximize the quality of the converted product.

In order to perform the control step 104, the processing unit 22 has previously been programmed for generating, in response to a command entered individually by the operator, at least two adjustment signals correlated by a predetermined so-called contrast law, as a predetermined adjustment law, intended to adjust the quantity of ink deposited on each cardboard sheet 4, the adjustment signals being selected from the group consisting of:
 the distance 6.8-8.6 between the plate cylinder 6 and the anilox cylinder 8, (the arrows 6.8 and 8.6 in FIG. 2 illustrate this adjustable parameter);
 the distance 6.10-10.6 between the plate cylinder 6 and the counter-pressure member 10, (the arrows 6.10 and 10.6 in FIG. 2 illustrate this adjustable parameter);
 the rotation speed of the plate cylinder 6; and
 the rotation speed of the anilox cylinder 8.

For this purpose, a computer program is stored in the processing unit 22. This computer program comprises coded instructions which, when the computer program is executed by the processing unit 22, performs the steps of the control method.

The invention claimed is:

1. A control method for controlling a converting machine that acts on plate elements for forming containers, the converting machine comprising at least: converting members configured to perform at least one action to induce, directly or indirectly, a conversion of each plate element, each converting member being configured to operate according to at least one adjustable parameter; a graphical control interface configured to display control areas to enable an operator to enter commands individually; and a processing unit connected to the graphical control interface and to the converting members; wherein the method comprises:
 displaying with the graphical control interface at least one image representing a plate element or a container formed by the plate element, and control areas superimposed on the image,
 wherein each control area symbolizes a magnitude of the conversion to be induced on each plate element;
 receiving by the processing unit a command entered individually by the operator by activating a control area of the graphical control interface; and
 controlling, in response to the individually entered command, the processing unit to generate at least two adjustment signals correlated by a predetermined adjustment law to adjust at least two adjustable parameters, whereby the corresponding converting members induce a change in the magnitude according to the adjustment signals generated.

2. A method according to claim 1, wherein the converting members comprise:
 a rotatably mounted plate cylinder suitable for carrying a plate and arranged for rolling the plate on each plate element to deposit thereon a quantity of ink in a pattern defined on the plate;
 an anilox cylinder arranged parallel to the plate cylinder, and configured to receive the quantity of ink from an ink reservoir and to transfer the quantity of ink to the plate cylinder by contact with the plate cylinder; and
 a counter-pressure member arranged parallel to the plate cylinder, and configured to exert pressure forces on each plate element rolling on the plate cylinder;
 and the processing unit generates the at least two adjustment signals correlated by a contrast law, as a predetermined adjustment law, to adjust the quantity of ink deposited on each plate element,
 wherein the adjustable parameters are selected from the group consisting of a distance between the plate cylinder and the engraved roller, a distance between the plate cylinder and the counter-pressure member, a rotation speed of the plate cylinder, and a rotation speed of the anilox cylinder.

3. A method according to claim 1, wherein the converting members comprise:
 folding rollers arranged for forming at least one fold on each plate element;
 at least one roller support suitable for supporting the folding rollers; and
 a counter-pressure member arranged for exerting pressure forces on each plate element in a direction opposite to the forces exerted by the folding rollers;
 and the processing unit generates at least two adjustment signals correlated by a folding law intended to adjust the depth of a fold on each plate element,
 wherein the adjustable parameters are selected from the group consisting of a clamping of the folding rollers onto the fold to hold the container in the folded state, a position of the roller support, and a distance between the roller support and the counter-pressure member.

4. A method according to claim 1, further comprising reconfiguring at least one predetermined adjustment law based on an operator input.

5. A method according to claim 1, wherein the converting machine further comprises a transport device suitable for transporting the plate elements successively toward each converting member, so that each converting member performs the action, and the control method further comprising:
 preliminarily stopping the transport device before the processing unit generates adjustment signals.

6. A converting machine of a printing machine, folding machine, or gluing machine that acts on plate elements for forming containers, the converting machine comprising at least:
 converting members, each converting member configured to induce, directly or indirectly, a conversion of each plate element, each converting member being configured for operating according to at least one adjustable parameter;
 a graphical control interface configured to display at least one image representing a plate element or a container formed by a plate element, and configured for displaying control areas superimposed on the image,
 wherein each control area symbolizes a magnitude of the conversion to be induced on each plate element; and
 a processing unit connected to the graphical control interface and to the converting members, and programmed to generate, in response to a command entered individually by an operator in response to the display, at least two adjustment signals correlated by a predetermined adjustment law to adjust at least two adjustable parameters, whereby the corresponding converting members induce a change in the magnitude according to the adjustment signals generated.

7. A machine according to claim 6, wherein the graphical control interface comprises a touch screen configured to transmit to the processing unit the command entered individually by the operator pressing on a control area of the touch screen.

8. A machine according to claim 6, further comprising adjustment actuators, each adjustment actuator being configured to adjust at least one adjustable parameter in response to one of said adjustment signals.

9. A machine according to claim 6, wherein the processing unit stores a plurality of predetermined adjustment laws to adjust a plurality of respective adjustable parameters.

10. A machine according to claim 9, wherein the adjustable parameters affect conversions.

11. A machine according to claim 10, wherein the conversion is selected from a group consisting of a contrast of color, a location of a color pattern on the plate element, a depth of a fold, a location of cuts, a size of the plate elements, and a quality of folding.

12. A non-transient processor-readable medium product comprising instructions configured to control, when executed by a processing unit, a converting machine that acts on plate elements for forming containers, the converting machine comprising at least: converting members configured to perform at least one action to induce, directly or indirectly, a conversion of each plate element, each converting member being configured to operate according to at least one adjustable parameter; a graphical control interface configured to display control areas to enable an operator to enter commands individually; a processing unit connected to the graphical control interface and to the converting members; and a graphical control interface, wherein the instructions control:
the graphical control interface to display at least one image representing a plate element or a container formed by the plate element, and control areas superimposed on the image,
wherein each control area symbolizes a magnitude of the conversion to be induced on each plate element;
the processing unit to receive a command entered individually by the operator by activating a control area of the graphical control interface; and
the processing unit, in response to the individually entered command, to generate at least two adjustment signals correlated by a predetermined adjustment law to adjust at least two adjustable parameters, whereby the corresponding converting members induce a change in the magnitude according to the adjustment signals generated.

\* \* \* \* \*